United States Patent [19]

Suvá et al.

[11] 3,917,445

[45] Nov. 4, 1975

[54] BAKING OVEN FOR BREAD

[75] Inventors: Tito R. Suvá; Hans-Peter Schmidt, both of Geneva, Switzerland

[73] Assignee: Grands Moulins De Paris, Paris, France

[22] Filed: May 24, 1974

[21] Appl. No.: 472,990

[30] Foreign Application Priority Data

May 25, 1973 Switzerland.................... 7524/73

[52] U.S. Cl. ............... 432/124; 432/138; 432/141; 432/147
[51] Int. Cl.²................................... F27B 9/16
[58] Field of Search ........ 432/10, 11, 124, 138, 141, 432/144, 147

[56] References Cited
UNITED STATES PATENTS

| | | | |
|---|---|---|---|
| 1,280,205 | 10/1918 | Garza................................ | 432/124 |
| 2,323,214 | 6/1943 | Gardner............................. | 432/124 |
| 2,637,283 | 5/1953 | Klein et al. ....................... | 432/141 |

*Primary Examiner*—John J. Camby
*Attorney, Agent, or Firm*—Karl F. Ross; Herbert Dubno

[57] ABSTRACT

Partly baked elongate bread loaves are transported through a baking chamber on the upper run of an endless conveyor formed by a series of closely juxtaposed squirrel-cage rollers which are set in codirectional rotation on passing along that upper run. The loaves, cradled in the troughs between adjacent rollers, are rotated about their own axes as they pass from an entrance chute to an exit chute underneath an array of infrared lamps. Blowers circulate cooling air through a pair of lateral ducts above two compartments which house the transport mechanism, part of this air being deviated into the baking chamber to maintain the hot atmosphere thereof in motion.

13 Claims, 2 Drawing Figures

BAKING OVEN FOR BREAD

FIELD OF THE INVENTION

Our present invention relates to an oven for the baking of bread and, more particularly, for the finishing and crusting of partly baked elongate loaves of the type known as "French" or "Italian" bread.

BACKGROUND OF THE INVENTION

It is known that the marketability of a plain loaf of bread, composed exclusively of flour, yeast, salt and water, depends largely on the firmness and appearance of its crust as well as on the structure of its crumb which should be elastic but not spongy. The aroma of the bread comes into being upon its baking and gradually diminishes during storage. Thus, a loaf of bread can be preserved for a limited period only and its organoleptic qualities deteriorate rather rapidly with time. An inevitable settling process results in a disappearance of its crustiness and in a drying and toughening of the crumb, usually making the loaf non-salable as early as about eight hours after baking.

As a rule, therefore, bakeries must operate day and night, seven days a week, in order to deliver bread several times per day. To avoid this inconvenience, some companies have begun to produce partly baked goods which last for several days in their semi-prepared condition and which can be subjected to a final baking operation by a distributor, restaurant or the like in order to provide a consumer with freshly baked bread at any time while minimizing losses due to stale products that have to be discarded. Such a finishing step, however, takes considerable time with conventional equipment and even then does not yield a crustiness comparable to that of normally baked bread so that the products are of inferior organoleptic quality. This fact, we believe, is the reason that the two-stage baking process has heretofore found commercial acceptance only in connection with smaller goods such as rolls or croissants. With larger products, especially with elongate loaves of so-called French or Italian bread, the aforementioned drawbacks are particularly objectionable.

OBJECTS OF THE INVENTION

The general object of our present invention, therefore, is to provide an improved baking oven for the finishing of partly pre-baked bread loaves which insures effective and uniform final baking with development of an eye-appealing crust and a pleasing aroma.

A related object is to provide a process for the final baking of such loaves which achieves the desired properties in a relatively short time, on the order of minutes, and which can be practiced by personnel having no particular skills in the art of baking.

SUMMARY OF THE INVENTION

In accordance with our present invention, elongate loaves of partly baked bread are introduced through an entrance slot into a baking chamber for transportation to an exit slot, in the opposite end wall of the chamber, via an endless conveyor subjecting each loaf to a continuous rotation about its own axis as it travels along that substantially horizontal path. The rotating loaves are heated, preferably by infrared irradiation from above, and may simultaneously be immersed in a surrounding atmosphere of hot air.

In accordance with a more particular feature of our invention, the endless conveyor transporting the rotating loaves includes a multiplicity of closely juxtaposed rollers which are independently rotatable about axes perpendicular to the transport direction, these rollers defining along the upper conveyor run a generally horizontal supporting surface with downwardly converging gaps wherein the loaves are individually cradled. The drive means serving to displace the rollers along the conveyor loop may also set each roller in rotation as it reaches the upper run; for this purpose, the shaft of each roller may carry on one of its extremities a toothed wheel, such as a sprocket, periodically engageable with a rack extending along the transport path, this rack being preferably movable against the transport direction to accelerate the rotation of the rollers and therefore also that of the loaves cradled therebetween. Such a movable rack may be constituted by a substantially horizontal reach of an ancillary chain linked with the transport chains of the conveyor through a suitable transmission.

According to a further feature of our invention, the drive mechanism including the aforementioned ancillary and transport chains is disposed in two lateral compartments of a housing spacedly surrounding the baking chamber, these compartments being separated from the baking chamber by thermally insulated sidewalls provided with endless slots which are traversed by the extremities of the roller shafts. The compartments may be cooled by ducts through which air is circulated with the aid of one or more blowers, part of this circulating air being preferably diverted into the interior of the baking chamber to set the heated air therein in motion. Currents of hot air will therefore pass outwardly from the chamber through its entrance and exit slots, and we prefer to utilize such a hot-air current at the entrance slot to preheat the entering loaves before subjecting them to irradiation.

BRIEF DESCRIPTION OF THE DRAWING

The above and other features of our invention will be described in detail hereinafter with reference to the accompanying drawing in which.

SPECIFIC DESCRIPTION

Figure 1:
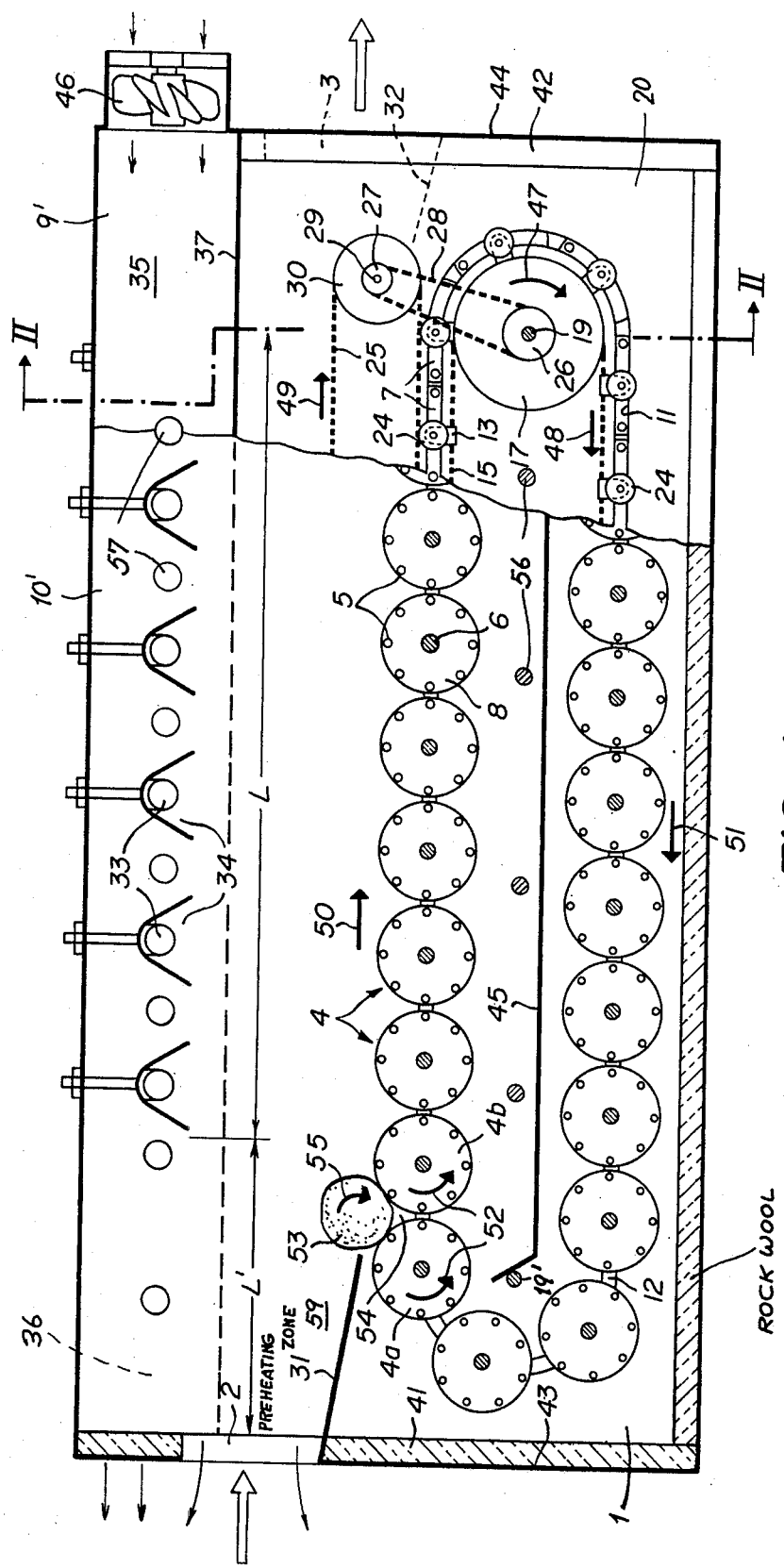
FIG. 1 shows, in longitudinal elevation, a baking oven embodying our invention.

The baking oven shown in the drawing comprises a chamber 1 bounded by sidewalls 9 and 10 as well as end walls 43 and 44 which are lined with respective layers 39, 40, 41, 42 of thermally insulating material such as rock wool. The end walls 43, 44 with their insulating layers 41, 42 have rectangular horizontal slots, i.e. an entrance slot 2 and an exit slot 3, from which respective chutes 31 and 32 extend toward an endless conveyor disposed within the chamber 1. The conveyor consists of a multiplicity of rollers 4 each comprising a pair of end members or cheeks 7, 8 rigid with a shaft 6 and a set of peripherally equispaced loaf-supporting members or rods 5 bridging these cheeks, the members 5, 7 and 8 defining an open structure which may be described as a squirrel cage. The roller shafts 6, which extend transversely to the transport direction 50, have extremities passing through respective slots 11 and 12 in sidewalls 9, 10 and linings 39, 40, these slots defining a pair of closed loops whose generally ellipsoidal shape corresponds to that of the conveyor track. The extremities of the roller shafts 6 are journaled in bearings 13 and 14 of two transport chains 15 and 16 which pass around respective sprocket wheels 17 and 18 on a shaft 19 near the exit end of the oven and a similar sprocket pair, not shown, on a shaft 19' near its entrance end. Shaft 19 is continuously driven by a non-illustrated motor as symbolically illustrated by arrows 47, to advance the rollers 4 along the upper conveyor run from the entrance chute 31 to the exit chute 32.

Each shaft 6 also carries a small sprocket or pinion 24 which, along the upper conveyor run, meshes with an ancillary endless chain 25 looped around a sprocket 30 on a shaft 29 at the exit end and a similar sprocket, now shown, at the entrance end. Shafts 19 and 29 are interlinked for joint rotation by a transmission including a pair of sprockets 26, 27 and a chain 28. Owing to this connection, sprockets 17 and 30 rotate clockwise (as viewed in FIG. 1) so that the transport chains 15, 16 and the ancillary chain 25 are concurrently displaced in a direction respectively indicated by arrows 48 and 49 whereby the lower reach of chain 25, adjoining the upper reach of chain 15, moves against the transport direction 50 to set the rollers 4 in counterclockwise rotation as indicated by arrows 52. The rollers returning from the exit end to the entrance end along the lower conveyor run, in the direction 51, do not turn about their axes.

An outer housing 58 defines with sidewalls 9, 10 a pair of lateral compartments 22, 23 provided with respective partitions 20 and 21 which support the several sprocket shafts 19, 19' and 29. Compartment 22 accommodates the chains 15 and 25 with their sprockets 17, 30 as well as the sprockets 24 on the ends of roller shafts 6 on one side of partition 20, transmission 26–28 being disposed in this compartment on the opposite (outer) side of that partition. Compartment 23 accommodates the chain 16 with its sprockets 18 between sidewall 10 and partition 21.

The conveyor composed of the rollers 4 is overlain by an array of radiation emitters 33, specifically infrared tubes suspended from the ceiling of chamber 1 and shielded against that ceiling by individual reflectors 34. A heat shield 45, which may also have a reflecting surface, is mounted between the two conveyor runs on the insular sidewall portions surrounded by slots 11 and 12, these sidewall portions being supported by stays 56 secured to the partitions 20 and 21. The array of radiators 33 is separated from the entrance end of chamber 1 by a preheating zone 59 in which entering loaves 53 are immersed in the hot oven atmosphere but are not subjected to irradiation from above. These entering loaves drop from chute 31 onto the substantially cycloidal conveyor surface defined by the upper roller peripheries, lodging in the gaps of that surface between adjoining rollers 4a, 4b so as to be rotationally entrained to turn clockwise (FIG. 1) about their own axes as indicated by arrow 55. Thanks to the open roller structure, and to the heat-reflecting character of shield 45, the loaves 53 also experience some irradiation from below as they travel along the upper conveyor run underneath the array of IR tubes 33.

If desired, the preheating zone 59 could also be located outside the end wall 43, in an antechamber adjoining the baking chamber 1.

In order to prevent overheating of the machinery in compartments 22 and 23, ambient air is circulated by a pair of blowers 46, 46' through a pair of horizontal ducts 35, 36 which extend within housing 58 above these compartments and are separated therefrom by thin, thermally conductive sheet-metal plates 37 and 38. Sidewalls 9 and 10, preferably consisting of sheet aluminum which may be highly polished to reflect the incident thermal radiation, have upward extensions 9', 10' which form the inner boundaries of ducts 35 and 36 adjacent the ends of the tubes 33. Apertures 57 in these wall extensions 9' and 10' deviate some of the circulating air flow into the chamber 1 to set up convection currents therein, one such current of hot air passing outwardly through entrance slot 2 after preheating the oncoming loaves in zone 59. Adjustment of the blower speed may thus be used to control the oven temperature in chamber 1.

In general, this temperature may be about 200°C, with the chamber walls preferably designed to withstand temperatures as high as 300°C. The thermal insulation 39, 40, which may have a thickness of about 3 cm, and the cooling effect of blowers 46, 46' should be so chosen as to maintain the temperature within the lateral compartments 22 and 23 at a level not higher than about 60° to 80°C.

Figure 2:
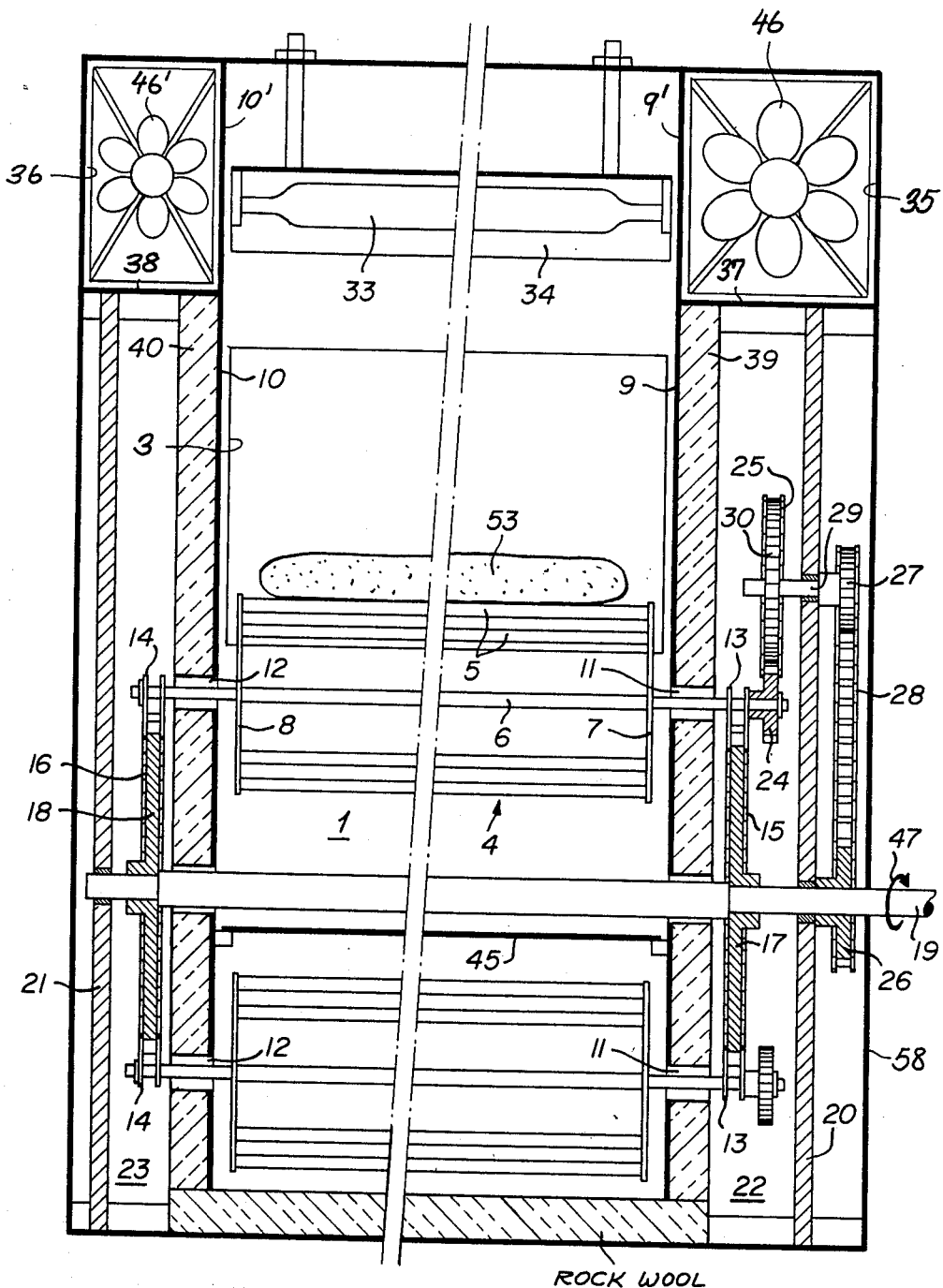
FIG. 2 is a cross-sectional view taken on the line II—II of FIG. 1.

Members 5, 7, 8 of the squirrel-cage rollers 4 should consist of a material, such as stainless steel 18/8, which does not react with the loaves supported thereby and which has a low absorption coefficient for infrared radiation. From FIG. 2 it will be noted that the length of the rollers is slightly larger than that of the loaves 53, slots 2 and 3 being of substantially the same length.

Our experiments have shown that the rotary speed imparted to the loaves 53 by the rollers 4 should be not less than about four revolutions per minute in order to prevent the appearance of striations due to non-uniform heating. With loaves about 5 to 6 cm in diameter, the rollers advantageously have a diameter of 7 cm and an axial spacing of 7.5 cm which makes for a compact assembly while preventing contact between adjacent loaves. The forward speed of the conveyor (in cm/min.), and therefore of the loaves, is the product of this axial spacing times the delivery rate in terms of loaves per minute.

The required electric power P for heating the oven can be calculated, in watts, from the formula $P = q \cdot w \cdot 0.375$ where $q$ is the delivery rate in terms of loaves per hour and $w$ is the weight of each loaf in grams.

The spacing between the rollers 4 and the radiators 33 should be large enough to prevent non-uniform or zonal heating but small enough to provide the necessary radiation intensity at the conveyor surface. We have found, for example, that a distance of 15 cm from the tube axis to the upper roller surfaces is suitable for smaller loaves weighing about 100 grams, this distance corresponding to a mean spacing of about 11.5 cm between the tube axes and the loaf axes.

The length L of the array of tubes 33 can be determined from the formula $L = aP/p$ where $a$ is the length of a tube and $p$ is its individual power rating. The length L' of the adjoining preheating zone 59 depends on the desired preheating time $t$ according to the relationship $L' = vt$, $v$ being the transport velocity. The irradiation of the advancing loaves need not be carried out electrically but could also be provided by other radiation sourced, e.g. steel plates heated by oil or gas burners to about 850°–900°C. The arrangement specifically illustrated in the drawing, however, is simpler to install and operate. Moreover, this system has a low thermal capacity so as to heat up rapidly at the beginning of operations. The shape of the rollers 4 may also be modified, though the disclosed squirrel-cage construction has been found particularly favorable.

In the following Table we have listed, by way of further example, specific parameters for a system of this nature with rollers 7 cm in diameter, axially spaced 7.5 cm apart, and with IR tubes 6 cm in diameter. From these values it will be noted that the system according to our invention can be realized with a wide variety of capacities; this includes even small units designed for self-service by a customer.

TABLE

| Measurements of Loaf | | Delivery Rate | Power Consumption | Transport Speed | Power Rating of IR Radiators | Number of IR Radiators | Length of Irradiation Zone | Length of Baking Chamber including pre-heating zone |
|---|---|---|---|---|---|---|---|---|
| Weight grams | Length cm | Loaves Per Hour | kW | cm/min. | W | | cm | cm |
| 125 | 25 | 100 | 4.7 | 12.5 | 1000 | 5 | 30 | 87 |
| | | 200 | 9.4 | 25 | '' | 10 | 60 | 130 |
| | | 300 | 14 | 37.5 | '' | 14 | 84 | 165 |
| | | 400 | 18.5 | 50 | '' | 19 | 114 | 210 |
| 250 | 50 | 100 | 9.4 | 12.5 | 2000 | 5 | 30 | 87 |
| | | 200 | 18.8 | 25 | '' | 10 | 60 | 130 |
| | | 300 | 28 | 37.5 | '' | 14 | 84 | 165 |
| | | 400 | 37 | 50 | '' | 19 | 114 | 210 |
| 250 | 80 | 100 | 11.5 | 12.5 | 3000 | 4 | 24 | 81 |
| | | 200 | 23 | 25 | '' | 8 | 48 | 120 |
| | | 300 | 34 | 37.5 | '' | 12 | 72 | 155 |
| | | 400 | 49 | 50 | '' | 16 | 86 | 180 |

We claim:

1. An oven for finishing and crusting partly baked bread, comprising:
   a baking chamber having a pair of opposite end walls respectively provided with an entrance slot and an exit slot for elongate loaves of partly baked bread;
   endless conveyor means disposed between said end walls within said chamber with an upper run substantially at the level of said entrance and exit slots for transporting said loaves from the former to the latter, said conveyor means including a multiplicity of closely juxtaposed rollers independently rotatable about axes perpendicular to the transport direction, said rollers having axially spaced end members interconnected by peripherally separated loaf-supporting members defining along said upper run a generally horizontal supporting surface with downwardly converging gaps;
   drive means for moving said conveyor with codirectional rotation of said rollers at least along said upper run whereby loaves cradled in said gaps are continuously turned about their own axes on passing from said entrance slot to said exit slot; and
   heat-radiating means in said chamber above said upper run.

2. An oven as defined in claim 1 wherein said conveyor means comprises a pair of parallel endless transport chains fitted with equispaced bearings, said rollers being provided with shafts having extremities journaled in said bearings, said drive means including a toothed wheel on each roller shaft and a rack extending along said upper run for periodic engagement with the toothed wheel of each roller shaft.

3. An oven as defined in claim 2 wherein said rack forms a substantially horizontal reach of an ancillary endless chain, said drive means including a transmission linking said ancillary and transport chains for displacement of said reach against said transport direction.

4. An oven as defined in claim 1 wherein said end members and loaf-supporting members form a squirrel cage.

5. An oven as defined in claim 1 wherein said loaf-supporting members have a length substantially equaling that of said entrance and exit slots.

6. An oven as defined in claim 1, further comprising a heat shield disposed in said chamber underneath said upper run.

7. An oven as defined in claim 1 wherein said entrance and exit slots are provided with chutes approaching said upper run.

8. An oven for finishing and crusting partly baked bread, comprising:
   a baking chamber having a pair of opposite end walls respectively provided with an entrance slot and an exit slot for elongate loaves of partly baked bread;
   endless conveyor means disposed between said end walls within said chamber with an upper run substantially at the level of said entrance and exit slots for transporting said loaves from the former to the latter, said conveyor means including a pair of endless transport chains fitted with equispaced bearings and a multiplicity of closely juxtaposed rollers with shafts having extremities journaled in said bearings for independent rotation about axes perpendicular to the transport direction, said rollers defining along said upper run a generally horizontal supporting surface with downwardly converging gaps;
   a toothed wheel on each roller shaft;
   an ancillary endless chain with a substantially horizontal reach forming a rack extending along said upper run for periodic engagement with the toothed wheel of each roller shaft;
   drive means for moving said conveyor with codirectional rotation of said rollers at least along said upper run whereby loaves cradled in said gaps are continuously turned about their own axes on passing from said entrance slot to said exit slot, said drive means including a transmission linking said ancillary and transport chains for displacement of said reach against said transport direction; and
   heat-radiating means in said chamber above said upper run.

9. An oven as defined in claim 8 wherein said chamber has thermally insulated sidewalls provided with endless slots traversed by said extremities, said transport chains and drive means being disposed outside said chamber along said sidewalls.

10. An oven as defined in claim 9, further comprising an outer housing spacedly surrounding said chamber and forming a pair of lateral compartments for said transport chains and drive means, said housing being further provided with ducts alongside said chamber for the circulation of cooling air past said compartments.

11. An oven as defined in claim 10 wherein said ducts are provided with blower means and are in communication with said chamber for deviating part of the air delivered by said blower means into the interior of said chamber.

12. An oven as defined in claim 11 wherein said heat-radiating means form an array of radiators overlying said rollers, said array being separated from said entrance slot by a preheating zone swept by a convection current of hot air from the interior of said chamber.

13. An oven as defined in claim 12 wherein said radiators are infrared lamps elongated transversely to the transport direction.

* * * * *